United States Patent
Willig et al.

(10) Patent No.: US 7,287,427 B2
(45) Date of Patent: Oct. 30, 2007

(54) RATE-OF-ROTATION SENSOR HAVING FREQUENCY ADJUSTMENT

(75) Inventors: Rainer Willig, Tamm (DE); Burkhard Kuhlmann, Eningen (DE); Udo-Martin Gomez, Leonberg (DE); Wolfram Bauer, Tuebingen (DE); Christoph Lang, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 183 days.

(21) Appl. No.: 11/137,977

(22) Filed: May 25, 2005

(65) Prior Publication Data
US 2006/0021433 A1    Feb. 2, 2006

(30) Foreign Application Priority Data
Jun. 2, 2004    (DE) ............... 10 2004 026 972

(51) Int. Cl.
*G01P 19/00*    (2006.01)
(52) U.S. Cl. ..................... 73/504.02; 73/1.77
(58) Field of Classification Search .......... 73/504.02, 73/504.04, 504.12, 504.13, 504.14, 504.15, 73/504.16, 1.37, 1.38, 1.77, 1.78
See application file for complete search history.

(56) References Cited

U.S. PATENT DOCUMENTS
6,675,630 B2 *    1/2004    Challoner et al. ........... 73/1.77
7,159,441 B2 *    1/2007    Challoner et al. ........... 73/1.77

FOREIGN PATENT DOCUMENTS
DE    199 10 415    3/1999
EP    1335187    8/2003
WO    WO2004/038331    5/2004

* cited by examiner

*Primary Examiner*—Helen Kwok
(74) *Attorney, Agent, or Firm*—Kenyon & Kenyon LLP

(57) ABSTRACT

A yaw-rate sensor having a resonant driving frequency and a resonant Coriolis frequency. In addition, the yaw-rate sensor has at least one operating voltage, of which the resonant Coriolis frequency is a function. The resonant Coriolis frequency is adjusted to the resonant driving frequency with the aid of an adjustment voltage. A change in the resonant Coriolis frequency as a result of a change in the operating voltage may be compensated for, in that a suitably changed adjusting voltage may be produced from a compensation circuit.

6 Claims, 2 Drawing Sheets

RATE-OF-ROTATION SENSOR HAVING FREQUENCY ADJUSTMENT

FIELD OF THE INVENTION

The present invention relates to a yaw-rate sensor, the yaw-rate sensor having a resonant driving frequency f_rA and a resonant Coriolis frequency f_rD. In addition, the yaw-rate sensor has at least one operating voltage U_MK, of which resonant Coriolis frequency f_rD is a function. Resonant Coriolis frequency f_rD is adjusted to resonant driving frequency f_rA with the aid of an adjustment voltage U_DF.

BACKGROUND INFORMATION

Many yaw-rate sensors are based on the utilization of the Coriolis effect as a measuring principle. The Coriolis force occurs when a body of mass m moves at velocity v and a rate of rotation Ω acts in a direction perpendicular to the direction of movement, where $$F_{Coriolis} = 2mv\Omega.$$

A possibility for setting a mass into motion is to induce a vibration in it, the driving vibration. If a rate of rotation acts on the vibrating mass, then the Coriolis forces cause it to react with a Coriolis vibration perpendicular to the driving vibration.

If the mechanism is combined with the electronics to form a resonant circuit, then a resonator is formed and the frequency of this driving vibration corresponds to the resonant driving frequency f_rA of the mechanism. The Coriolis vibration then occurs at the resonant driving frequency, as well. However, resonant frequency f_rD of the Coriolis mode is independent of resonant driving frequency f_rA. Since the sensitivity to the Coriolis effect is greatest at the resonant frequency of Coriolis mode f_rD, it is useful to adjust frequency f_rD to correspond to resonant driving frequency f_rA.

This adjustment of resonant Coriolis frequency f_rD may be accomplished with the aid of electrostatic, positive-feedback forces, which counteract the mechanical spring stiffness and therefore lead to an effective reduction in the spring stiffness, through which resonant frequency f_rD may be reduced. An option for adjusting the frequency is to design the mechanism in such manner that its resonant Coriolis frequency f_rD is greater than the resonant driving frequency. Then, by applying an electrical voltage U_DF to the sensor element, the electronics may generate electrostatic, positive-feedback forces so that the resonant frequency of the Coriolis mode is reduced sharply enough to correspond to the resonant driving frequency. Electrical voltage U_DF_Abgl required for this purpose may be adjusted inside the electronics. This is described, for example, in German Patent Application No. DE 19910415 A1.

One problem with the conventional system occurs when further voltages must be generated in the electronics for the purpose of measuring or compensation; those voltages also acting on the sensor element as well, and shifting resonant Coriolis frequency f_rD to lower frequencies, due to the electrostatic positive feedback caused by the voltages. All of the voltages, which also act on the sensor element for reasons of measuring or compensation, are represented by voltage U_MK in the following analyses. When adjusting voltage U_DF_Abgl, one must make sure that U_MK assumes a value that is typical for the operation of the sensor. This value is hereinafter referred to as U_MK_Abgl.

During operation of the sensor, U_MK may also change by the amount of voltage difference ΔU_MK. The reasons for this could be, for example, that circuits for suppressing interference in the sensor element change their output voltage due to temperature dependences or long-term drift. Voltage change ΔU_MK leads to a corresponding, disruptive shift of resonant Coriolis frequency f_rD.

SUMMARY

An example embodiment of the present invention includes a yaw-rate sensor, the yaw-rate sensor having a resonant driving frequency f_rA and a resonant Coriolis frequency f_rD. In addition, the yaw-rate sensor has at least one operating voltage U_MK, of which resonant Coriolis frequency f_rD is a function. Resonant Coriolis frequency f_rD is adjusted to resonant driving frequency f_rA with the aid of an adjustment voltage U_DF. A compensation circuit is provided, with the aid of which a change in resonant Coriolis frequency f_rD due to a change in operating voltage U_MK may be compensated for, in that a suitably changed adjustment voltage U_DF may be produced from the compensation circuit. By this means, shifts in resonant Coriolis frequency f_rD may be advantageously compensated for.

Resonant Coriolis frequency f_rD of the yaw-rate sensor advantageously corresponds to resonant driving frequency f_rA.

To compensate for the shift in resonant Coriolis frequency f_rD, the compensation circuit advantageously has a compensation factor k, which is determined by voltages U_DF_Abgl and U_MK_Abgl. In this connection, it may be advantageous to select compensation factor k as a function of the operating point, which is determined by voltages U_DF_Abgl and U_MK_Abgl.

An advantageous refinement of the present invention provides for compensation factor k to be stored in the compensation circuit by a characteristics field in the form of at least one value table. This has the advantage that neither temperature dependences nor long-term drift of electronic circuits must be considered for determining compensation factor k in an analog manner.

It may also be advantageous to use a characteristics field, which may be implemented in both analog and digital form, for determining compensation factor k as a function of the operating point.

A particularly advantageous refinement of the present invention provides for compensation factor k to be stored in the compensation circuit by a characteristics field in the form of two value tables, one value table having input values of voltage U_DF_Abgl and the other value table having input values of voltage U_MK_Abgl. In this manner, the total number of entries in the value tables may be minimized.

It is also advantageous to use the one value table for linearizing the change in resonant Coriolis frequency f_rD as a function of the change in voltage U_MK, which allows the other value table to only consider the operating point that is determined by adjusted voltage U_DF_Abgl.

It may be particularly advantageous to digitally implement the action of the compensation factor for frequency compensation. This results in, inter alia, cost advantages due to circuits that are simple to produce.

BRIEF DESCRIPTION OF THE DRAWINGS

Exemplary embodiments of the present invention are represented in the figures and are explained in detail in the description below.

DETAILED DESCRIPTION OF EXAMPLE EMBODIMENTS

The present invention is represented in detail on the basis of the specific example embodiments described below.

Figure 1:
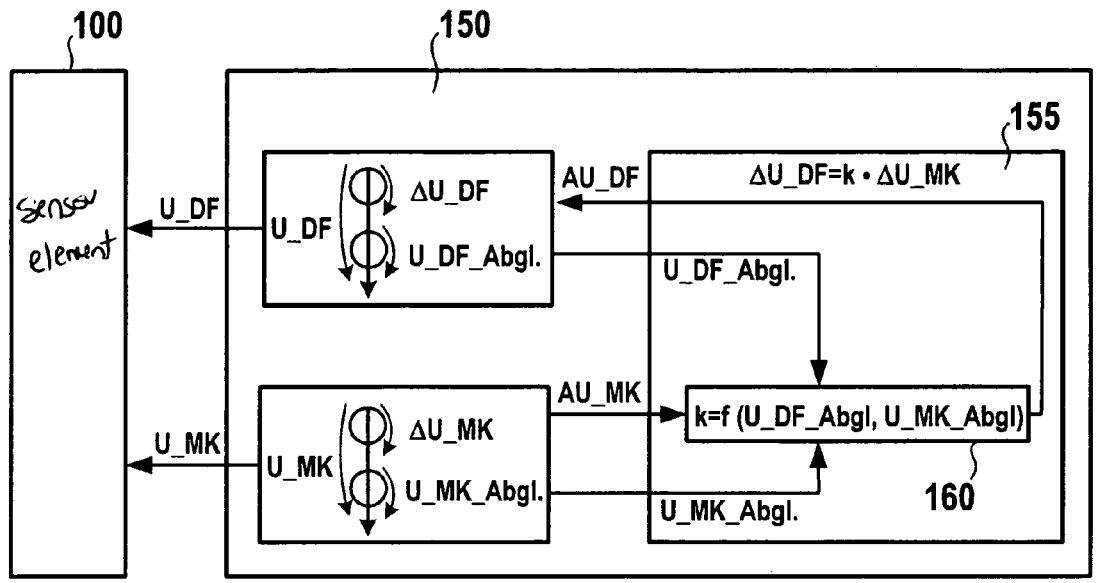
FIG. 1 shows an example a yaw-rate sensor of the present invention, in which the resonant Coriolis frequency is adjusted.

FIG. 1 shows an example yaw-rate sensor of the present invention, in which the resonant Coriolis frequency is adjusted. The yaw-rate sensor includes a sensor element 100 and evaluation electronics 150. Evaluation electronics 150 include a compensation circuit 155 and a function 160 in it for determining a compensation factor k. Sensor element 100 is controlled by evaluation electronics 150, using voltages U_DF and U_MK. Variable U_MK is the sum of voltage U_MK_Abgl, which is applied at the time of U_DF Abgleich, and voltage change $\Delta$U_MK, which occurs during the operation of the sensor. This voltage change $\Delta$U_MK constitutes the input signal for compensation circuit 155 according to an example embodiment of the present invention. This compensation circuit multiplies value $\Delta$U_MK by compensation factor k, and the resulting value is used for changing voltage U_DF by the amount of voltage difference $\Delta$U_DF.

Therefore, an intervention in voltage U_DF is such that a change in resonant Coriolis frequency f_rD caused by a voltage change $\Delta$U_MK is compensated for by correspondingly adjusting voltage U_DF via a compensation circuit.

Figure 2:
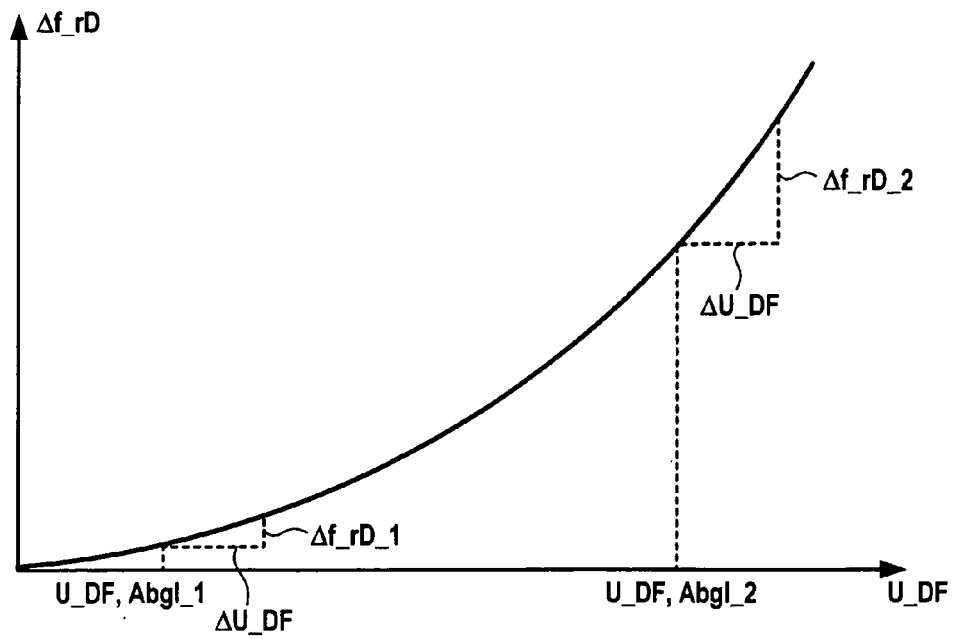
FIG. 2 shows the dependence of the adjustment of the resonant Coriolis frequency on the operating point.

FIG. 2 shows the dependence of the adjustment of the resonant Coriolis frequency on the operating point. In the graph, frequency change $\Delta$f_rD of resonant Coriolis frequency f_rD is plotted versus voltage U_DF. One exceptional feature of the present invention is that compensation factor k is rendered a function of the adjustment values of voltages U_DF_Abgl and U_MK_Abgl. The dependence of compensation factor k on the operating point in accordance with the present invention is explained in the following.

The electrostatic force in sensor element 100 is proportional to the square of the voltage applied to sensor element 100. When the electrostatic force dominates over the mechanical spring force, the change in the resonant sensor frequency is also proportional to the square of the voltage applied to sensor element 100. This relation is exemplarily shown in FIG. 2 for the effect of voltage U_DF on the change in resonant Coriolis frequency f_rD. If one looks at operating point U_DF_Abgl_1, then a change in voltage U_DF of value $\Delta$U_DF results in a change in frequency of magnitude $\Delta$f_rD_1. At operating point U_DF_Abgl_2, the same change $\Delta$U_DF results in considerably greater frequency change $\Delta$f_rD_2. The quadratic dependence also applies to the frequency change as result of the voltage change of U_MK.

Figure 3:
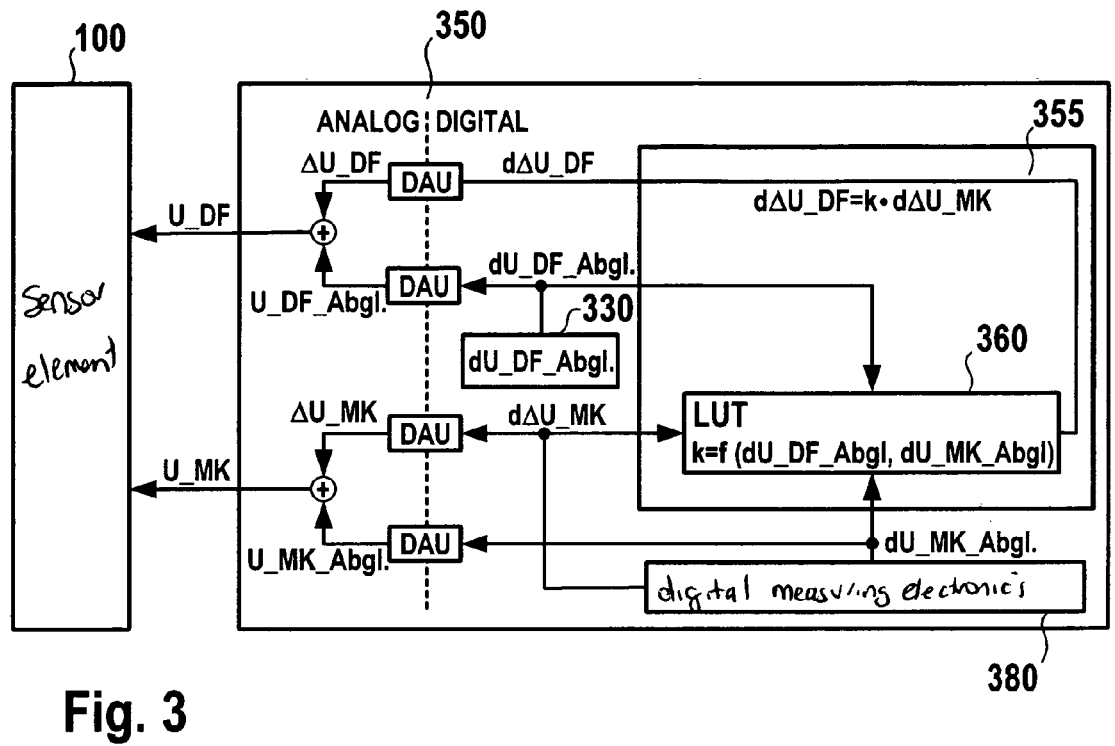
FIG. 3 shows an example a yaw-rate sensor of the present invention, having digital evaluation electronics and a stored value table.

FIG. 3 shows a yaw-rate sensor of the present invention, having digital evaluation electronics and a stored value table.

If the effect of a voltage change $\Delta$U_MK on resonant Coriolis frequency f_rD is compensated for according to the example embodiment of the present invention by changing voltage $\Delta$U_DF, then compensation factor k to be selected must be rendered a function of voltage values U_DF_Abgl and U_MK_Abgl, which describe the operating point. An option of the present invention for accomplishing this is to use a characteristics field, by which corresponding compensation factor k may be determined as a function of voltages U_DF_Abgl and U_MK_Abgl.

In analog circuitry, such an adjustment of compensation factor k as a function of the operating point may be implemented, for example, with the aid of slope multipliers. Such implementation may be expensive, since temperature dependences and long-term drift must be considered.

An example alternative to this is to store the characteristics field in the form of a value table (look-up table, LUT). This has the advantages, that neither temperature dependences nor long-term drift must be feared. Stored value table LUT, as well as the digital multiplication, are less susceptible to faults than the analog design approach.

A digital embodiment of the yaw-rate sensor according to the example embodiment of the present invention is shown in FIG. 3. Sensor element 100 and evaluation electronics 350 are shown. Evaluation electronics 350 have an analog and a digital part, which are separated in the figure by a dashed line. Digital signals are converted to analog signals by a digital-to-analog converter (DAU). The represented digital signals are characterized by signal names beginning with the letter "d." Evaluation electronics 350 includes a compensation circuit 355 having a value table 360 for determining compensation factor k, and digital measuring electronics 380.

Digital measuring electronics 380 generate a digital signal dU_MK_Abgl, which describes the operating point, and a digital signal d$\Delta$U_MK, which causes the change in voltage U_MK. A digital value dU_DF_Abgl, which is a measure of the adjusted voltage for adjusting the resonant Coriolis frequency, controls a digital-to-analog converter (DAU) and is used as an input signal for the characteristics field, which is stored in value table (LUT) 360 and is for determining compensation factor k. The digital product of this factor k and signal d$\Delta$U_MK is referred to as D$\Delta$U_DF. This signal is used for controlling a DAU and is converted to analog signal $\Delta$U_DF, which is added to adjusted voltage U_DF_Abgl and compensates for the disruptive effect of voltage change $\Delta$U_MK.

Figure 4:
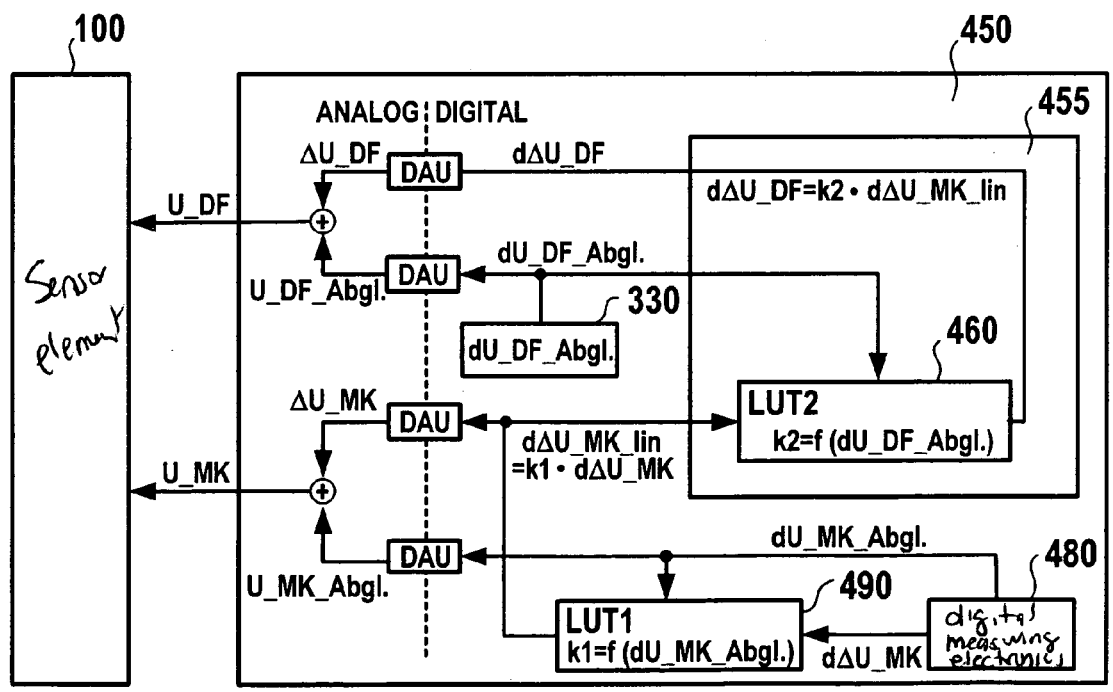
FIG. 4 shows an example a yaw-rate sensor of the present invention, having digital evaluation electronics and two stored value tables.

FIG. 4 shows an example yaw-rate sensor of the present invention, having digital evaluation electronics and two stored value tables. Sensor element 100 and evaluation electronics 450 are shown. Evaluation electronics 450 include a first value table (LUT1) 490, digital measuring electronics 480, and a compensation circuit 455 having a second value table (LUT2) 460.

The above-described value table (LUT) having two input signals for describing the operating point may be markedly simplified, especially when it is ensured that compensation factor k is only a function of the operating point of voltage U_DF_Abgl. An exemplary embodiment of this, according to the present invention, is shown in FIG. 4. In this case, the digital measuring electronics also generate a digital signal dU_MK_Abgl determining the operating point, and a signal change D$\Delta$U_MK. This signal change is digitally multiplied by a factor k1 to yield digital signal d$\Delta$U_MK_lin. Factor k1 is a function of the value of signal dU_MK_Abgl and is ascertained with the aid of a LUT. Signal d$\Delta$U_MK_lin controls a DAU, which generates analog voltage change $\Delta$U_MK. The above-described electronics are already used, for example, in a digital controller for suppressing interfering signals in the yaw-rate sensor and may therefore have a dual use, since they also ensure that compensation factor k2 for the frequency adjustment is only rendered a function of the operating point of signal dU_DF_Abgl. This factor k2 is digitally multiplied by signal dΔU_MK_lin to yield digital signal DΔU_DF, which is used to control a DAU and, therefore, to generate voltage change ΔU_DF.

Also possible is an implementation in which signal dΔU_MK_lin is not applied to the input of LUT2, but rather signal dΔU_MK is applied directly to the input of LUT2. Therefore, instead of one LUT having two input signals, two LUT's having one input signal each are used, which means that the number of possible compensation factors to be stored may be drastically reduced. If signal dU_DF_Abgl is quantized to have a resolution of x Bits and signal dU_MK_Abgl is quantized to have a resolution of y Bits, then a LUT having x times y entries is reduced to one LUT having x entries and one LUT having y entries. Instead of x times y storage elements, only x+y storage elements are needed. In addition, it is possible for a circuit part already required to have a dual use. This may be, for example, the part of a digital controller for suppressing interfering signals.

The principal may also be applied to an analog implementation.

Furthermore, other exemplary embodiments are also possible.

What is claimed is:

1. A sensor, comprising:
a yaw-rate sensor having a resonant driving frequency and a resonant Coriolis frequency, the yaw-rate sensor further having at least one operating voltage of which the resonant Coriolis frequency is a function;
an arrangement configured to adjust the resonant Coriolis frequency to the resonant driving frequency using an adjustment voltage; and
a compensation circuit, the aid of which a change in the resonant Coriolis frequency as a result of a change in the operating voltage is compensated for by adjustment of the voltage;
wherein the sensor is controlled by a first voltage and a second voltage, where the second voltage is the sum of a voltage applied at a time, and a voltage change which occurs during operation of the sensor, where the voltage change is an input signal for the compensation circuit.

2. The yaw-rate sensor as recited in claim 1, wherein the resonant Coriolis frequency corresponds to the resonant driving frequency.

3. The yaw-rate sensor as recited in claim 1, wherein the compensation circuit has a compensation factor which is determined by first and second voltages.

4. The yaw-rate sensor as recited in claim 3, wherein the compensation factor is stored in the compensation circuit using a characteristics field in the form of at least one value table.

5. The yaw-rate sensor as recited in claim 3, wherein the compensation factor is stored in the compensation circuit using a characteristics field in a form of two value tables a first one of the value tables having input values of the first voltage and a second one of the value tables having input values of the second voltage.

6. The yaw-rate sensor as recited in claim 1, wherein the compensation circuit modifies the voltage change by a compensation factor, and a resulting voltage value is used to change the first voltage by a voltage difference amount.

* * * * *